United States Patent [19]

Yamada et al.

[11] 4,280,987
[45] Jul. 28, 1981

[54] METHOD FOR TREATMENT OF BAYER LIQUOR

[75] Inventors: Yasunori Yamada, Tokyo; Yuji Shibue, Kamakura, both of Japan

[73] Assignee: Showa Aluminum Industries K.K., Tokyo, Japan

[21] Appl. No.: 53,521

[22] Filed: Jun. 29, 1979

[30] Foreign Application Priority Data

Jul. 11, 1978 [JP] Japan .................................. 53-83494

[51] Int. Cl.³ .............................................. C01F 7/06
[52] U.S. Cl. .................................... 423/119; 423/121; 423/130
[58] Field of Search ................ 423/119, 121, 122, 130

[56] References Cited

U.S. PATENT DOCUMENTS

| 2,806,766 | 9/1957 | Anderson | 423/129 |
| 2,981,600 | 4/1961 | Porter | 423/130 |
| 4,038,039 | 7/1977 | Carruthers | 423/130 |

Primary Examiner—Herbert T. Carter
Attorney, Agent, or Firm—Oblon, Fisher, Spivak, McClelland & Maier

[57] ABSTRACT

Bayer liquor containing carbon compounds is freed from the carbon compounds by a method which comprises adjusting the molar ratio of the aluminum component to the sodium component in the liquid to a value in the range of from 1 to 5 calculated as $Al_2O_3/Na_2O$ and heating the resultant Bayer liquor.

7 Claims, 1 Drawing Figure

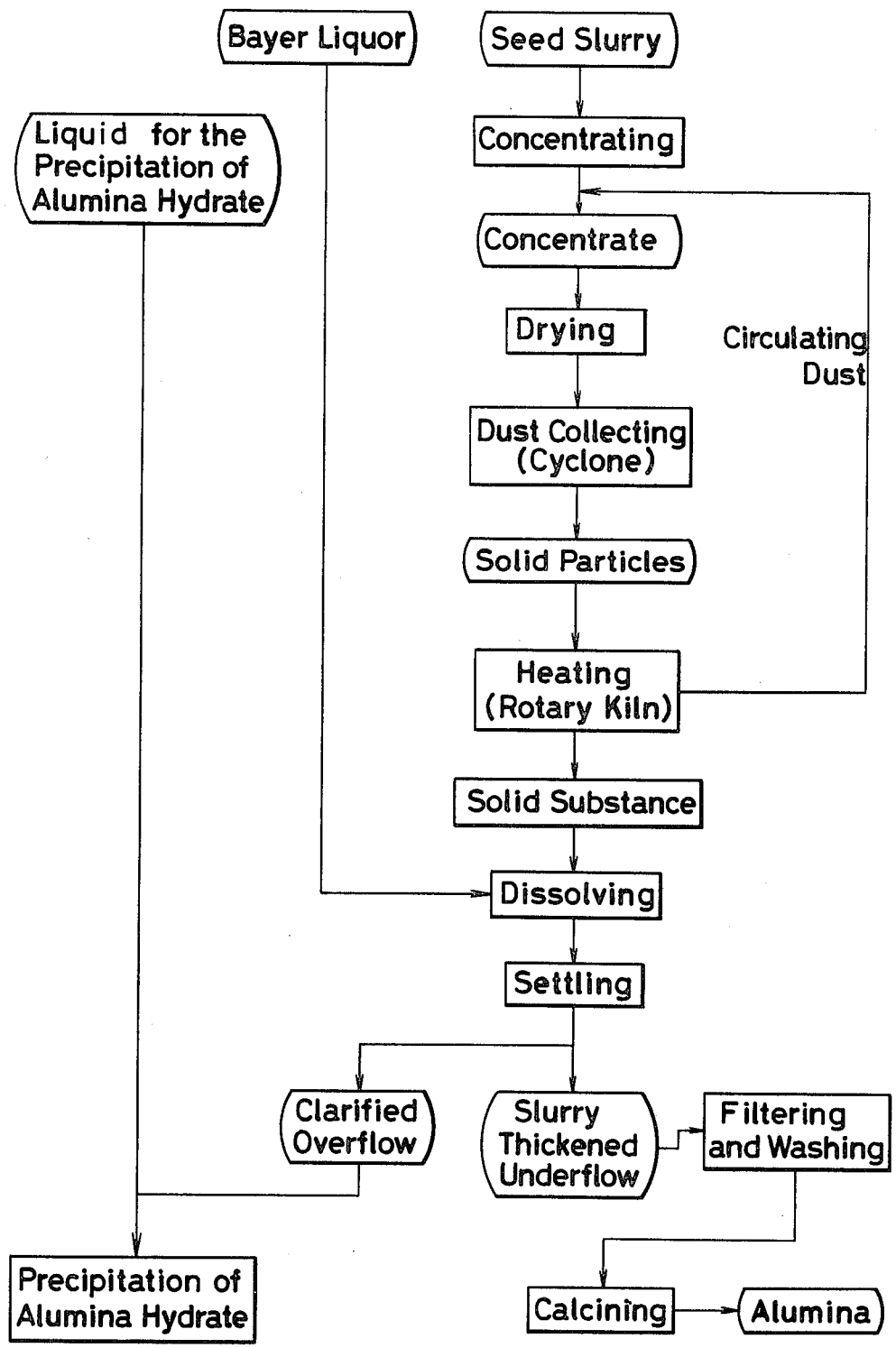

METHOD FOR TREATMENT OF BAYER LIQUOR

BACKGROUND OF THE INVENTION

This invention relates to a method for the removal of carbon compounds from the Bayer liquor in the manufacture of alumina by the Bayer Process.

The Bayer Process for the manufacture of alunina is a procedure which comprises dissolving an alumina-containing ore, usually bauxite, in conjunction with an aqueous caustic soda solution in a digester thereby causing the alumina component of the bauxite to be extracted in the form of sodium aluminate into the liquid, separating the insoluble component (called "red mud") from the liquid, adding a seed to the supernatant sodium aluminate remaining after the separation of the red mud, decomposing the sodium aluminate to precipitate alumina hydrate, isolating the alumina hydrate and calcining the isolated alumina hydrate to produce alumina. The hydrated alumina in its uncalcined form finds utility as the raw material for various aluminum compounds and for activated alumina and as the filler for synthetic resins.

The liquid which remains after the separation of the alumina hydrate is circulated for re-use in the Bayer Process.

As is evident from the explanation given above, in the system operated for the manufacture of alumina by the Bayer Process, the liquids containing the sodium component and the aluminum component are recycled. In the present invention, all these liquids are collectively referred to as "Bayer liquor". This invention aims to provide a method capable of removing the carbon compounds which come to be contained in the Bayer liquor for various causes to be described afterward. The term "carbon compounds" as used in the present invention refers to sodium carbonate, sodium oxalate and all other organic and inorganic compounds which contain carbon atoms.

Carbon compounds pass into the Bayer liquid roughly by the following major causes.

(1) Bauxite: Bauxite is a natural ore which contains various carbon compounds present in soil. Bauxite produced in tropical zones is dug out in open cut mines and since the ore is mined simply by stripping a shallow surface layer of the earth's crust, it contains vegetable components in a relatively large amount. Although the content and kind of carbon compounds contained in bauxite vary with the variety of bauxite, the bauxite generally contains 0.1 to 0.5% by weight, as carbon, of such carbon compounds. Specifically, they are carbonates of alkaline earth elements or, more frequently, organic compounds such as humin, bitumen and butin which have molecular weights varying over a wide range.

(2) Flocculant: A synthetic high-molecular flocculant such as a polyacrylate or polyacrylamide or a natural flocculant such as starch is used for the purpose of accelerating sedimentary separation during the separation of red mud or the separation of precipitated alumina hydrate.

(3) Defoaming agent: The Bayer liquor foams which it takes in an organic substance. To preclude this foaming, a defoaming agent which is a carbon compound such as a fatty acid ester is used at various stages throughout process.

(4) Carbon dioxide gas present in air: Air lift agitation is usually employed for facilitating the precipitation of alumina hydrate. In this case, the liquid being agitated absorbs carbon dioxide gas from air and a carbonate is produced.

(5) Caustic alkali as raw material: Generally about 100 kg equivalent of caustic soda is used for each ton of alumina to be produced. This amount of caustic soda contains 0.1 to 10 g/lit. of sodium carbonate.

A part of the carbon compounds which have passed into the Bayer liquid from the various sources enumerated above are discharged from the Bayer liquor through the following paths.

(1) A part of the carbon compounds contained in the bauxite escape dissolution and pass in their unaltered form into the red mud. The greater part of the flocculant used for accelerating the sedimentary separation of red mud is discharged from the liquid together with the red mud. A small amount of the Bayer liquor is deposited on the red mud and discharged together therewith out of the system. In the stage of bauxite digestion, a minor or major part of kaolinitic silicon oxide and quartz present in the bauxite, upon dissolution, react with caustic soda and re-precipitate themselves as sodalitic solids (desilication product) and eventually are discharged as part of the red mud. Carbon compounds in the form of carbonates, for example, find their way into these solids and are discharged together therewith.

(2) The alumina hydrate is separated by filtration and washing. The filtered alumina hydrate has about 10% of water adhering thereto. A small amount of carbon compounds are dissolved in the water so adhering to the alumina hydrate. Organic acids are part of the main carbon compounds present in the Bayer liquor. As the total concentration of such organic acids increases, sodium salts of such organic acids are isolated during the precipitation of alumina hydrate. These sodium salts, either in their unaltered form or after having formed nuclei for the crystallization of alumina hydrate, are discharged out of the system in conjunction with the alumina hydrate.

(3) Chiefly in the stage of bauxite digestion, part of the carbon compounds are gasified (preponderantly into carbon dioxide gas) through reaction with caustic soda and discharged out of the system.

(4) Part of carbon compounds are deposited in the form of scale on the inner wall surface of the production equipment and, thus, are discharged out of the system.

Many of the organic compounds present in the bauxite are dissolved in the caustic soda solution in the digestion stage held at elevated temperatures (130° to 300° C.). At first the dissolved organic compounds are high-molecular compounds. As they undergo successive decomposition under pressure and heat, they are gradually converted into low-molecular intermediate carbon compounds such as succinic acid and acetic acid. Eventually the major part of them are turned substantially into sodium oxalate and sodium carbonate. As a result, the carbon compounds present in the Bayer liquor consist of sodium oxalate, sodium carbonate, high-molecular organic compounds originally entrained by the liquid and intermediate carbon compounds. They accumulate in the Bayer liquid to an increasingly higher total concentration.

Besides, the high-molecular flocculant used for accelerating the sedimentary separation of the precipitated alumina hydrate is entrained by the finely divided alumina trihydrate crystals serving as the seed for precipitation of alumina hydrate and circulated throughout the production system. During the circulation through the system, the flocculant undergoes successive chemical changes and keeps on growing in amount in the system.

The total concentration of carbon compounds present in the Bayer liquid is determined by the amounts of various source substances entering into or departing from the liquid as described above.

Presence of carbon compounds in the Bayer liquor hinders the Bayer Process in the following ways:

(1) The rate of precipitation of alumina hydrate is lowered. Since the rate of precipitation is affected by various factors, the change in the actual amount of precipitation cannot be accurately estimated from only the amount of carbon compounds present. It has been demonstrated empirically, however, that the rate of precipitation is lowered by 0.2 to 0.5% for an increase of 1 g/lit. in the concentration of sodium carbonate and by 0.5 to 2% for an increase of 1 g/lit. (as carbon) in the concentration of an organic acid salt.

(2) The crystals of the precipitated alumina hydrate become finer in proportion as the concentration of sodium oxalate present in the Bayer liquor increases. As a result, the efficiency of separation of the precipitated alumina hydrate from the Bayer liquid is proportionally degraded and, accordingly, the amount of the alumina hydrate remaining in the liquid being circulated through the production system increases.

For the purpose of preventing the decrease in grain size of the precipitated alumina hydrate, there have been suggested a method (U.S. Pat. No. 2,935,376) which involves heating the seed added to the liquid and a method which adopts a higher temperature for the precipitation. Both methods inevitably impair the efficiency of the production of alumina.

(3) As the concentration of sodium oxalate increases, the deposition of scale on the inner wall surface of the reaction vessels and pipes grow conspicuous and the period of the continuous operation of the production system is shortened greatly.

(4) As the concentration of carbon compounds increases, the liquid changes color (to a blackish brown, for example) and is opacified. Further there is a possibility of the liquid growing viscous so much as to impede the sedimentary separation of the alumina hydrate. The liquid, consequently, gains in foaming property. Moreover, the capacity for the sedimentary separation of red mud is impaired.

(5) When the alumina hydrate is used as a final product, particularly as a filler for other products, it is desired to possess the highest possible whiteness. The presence of carbon compounds imparts a color to the alumina hydrate to lower the degree of whiteness and impair the commercial value.

The necessity for keeping the total concentration of carbon compounds in the Bayer liquid at a low level derives not only from the need to attain good efficiency of production and quality of product but also from the need to meet increasingly tight pollution controls over plant effluents for the sake of the preservation of the environment. Many of alumina production plants make it a rule to discard the red mud slurry resulting from the last stage of washing not in the sea but on land. The most popular way of disposal consists in dumping the slurry in large artificial ponds and allowing the supernatant occurring in such ponds to be released into natural bodies of water located near the ponds. In this system of disposal, the volume of pollutants such as COD and soda compounds contained in the supernatant released finally into the nearby natural bodies of water is subject to severe control. Thus, the concentration and amounts of such substances must be maintained at a low level. For this reason, the red mud slurry must be subjected to the treatments such as of filtration, concentration and washing before it is dumped in the artificial ponds. The liquid which emanates from these treatments contains alkalis. To prevent the loss of these alkalis, this liquid must be returned to the production system in the plant. This liquid also contains carbon compounds. Thus, the return of this liquid to the system results in further accumulation of carbon compounds in the Bayer liquid.

This problem has some bearing upon the supply and demand situation regarding the ore as a raw material. Recently it has become increasingly more difficult to obtain gibbsitic bauxite which enjoys ready solubility and supply of sparingly soluble boehmitic diasporic bauxite is gradually growing in volume. For effective treatment, the sparingly soluble bauxite must be dissolved at a higher temperature under high pressure. As an inevitable consequence, the ratio of solution of carbon compounds of the ore in the soda liquid increases and the concentration of carbon compounds in the Bayer liquid increases all the more.

When alumina is manufactured by the Bayer Process, therefore, the hindrance caused by carbon compounds is aggravated. For this reason, there has been a strong need for establishment of a process for decisively more effective removal of carbon compounds from the Bayer liquor.

Some methods have been suggested with a view to removing of the carbon compounds and a serious obstacle to the manufacture of alumina by the Bayer Process has been overcome by these methods. Examples are a pressurized oxygen method (Japanese Patent Publication No. 30548/1970), an ultraviolet ray irradiation method (Japanese Patent Laid-open Publication No. 20097/1974), a cooling method (U.S. Pat. No. 3,508,884), a magnesium hydroxide coprecipitation method (Japanese Patent Laid-open Publication No. 130692/1976), a causticizing method (U.S. Pat. No. 3,120,996 and U.S. Pat. No. 3,341,286), a sodium oxalate removing method (U.S. Pat. Nos. 3,649,185 and 3,372,985 and Japanese Patent Publications No. 11480/1973, No. 398/1978 and No. 400/1978) and a bauxite burning method (Japanese Patent Laid-open Publication No. 21395/1972). Of these methods, the causticization method and the sodium oxalate removing method have so far been commercially applied. The principle of the causticizing method comprises converting the sodium carbonate in the Bayer liquor with slaked lime into caustic soda and calcium carbonate and separating calcium carbonate and removing it from the liqiud. The causticizing method may embrace an additional step of evaporating the Bayer liquor, either alone or in combination with another step of further effecting salting out. In any event, the treatment of the liquid in this method must be carried out at a low caustic concentration, and accomplished with poor efficiency in its removal. Moreover, the method is, as a practical matter, capable of removing only sodium carbonate.

The bauxite burning method is based on a procedure comprising the steps of crushing bauxite ore, calcining the crushed ore under an oxidizing atmosphere thereby removing the organic compounds from the ore by virtue of combustion, and thereafter subjecting the remaining ore to digestion in conjunction with caustic soda. Since the ore itself is calcined, this method inevitably calls for use of a large furnace for this calcination and entails consumption of a large volume of fuel. Besides, the calcination degrades the yield of alumina extraction in digestion.

In the case of the sodium oxalate removing method, since sodium oxalate is precipitated in the form of fine particles in conjunction with the alumina hydrate in the stage for the precipitation of alumina hydrate, this method, in the stage for the filtration of the alumina hydrate, separates sodium oxalate in the form of an aqueous solution from the liquid through treatments such as filtration and washing, converts the sodium oxalate with added lime into calcium oxalate and caustic soda, and finally removes the formed calcium oxalate out of the system. The precipitation and separation of sodium oxalate is accomplished by suitably adjusting the concentration of the liquid and the temperature condition. Actually, however, it is difficult to remove the sodium oxalate so as to lower the concentration of the residual sodium oxalate below a certain level. In addition, this method has the disadvantage that it inevitably entails addition of water to the system for the purpose of dissolving sodium oxalate. Japanese Patent Publication No. 92900/1977 and French Pat. No. 75 32169 disclose a barium method which aims to educe and separate the carbonate radical and the oxalate radical in the form of barium salts by addition of barium ion. This method has the disadvantage that it necessitates use of expensive barium and the process itself is rather complicate.

U.S. Pat. No. 4,036,931 and Japanese Patent Laid-open Publication No. 1700/1978 teach a method which comprises causing carbon dioxide gas to react upon the Bayer liquor to which the supernatant formed on the red mud pond has been recycled thereby producing sodium dawsonite, $NaAl(OH)_2CO_2$, in the form of a precipitate, removing the settled precipitate, decomposing the removed precipitate by calcination into sodium aluminate and recycling sodium aluminate to the Bayer Process. Although this method proves to be effective in the recovery of soda components in the supernatant in the red mud pond, it is totally ineffective in the removal of carbon compounds, particularly organic compounds, from the Bayer liquor.

An object of the present invention is to provide a method which enables desired removal of carbon compounds to be accomplished with higher efficiency than the various methods described above without reference to the kind of carbon compounds.

Another object of the present invention is to establish a method for efficient removal of carbon compounds in the manufacture of alumina by the Bayer Process to thereby heighten the efficiency of the production of alumina by the Bayer Process and prevent possible pollution of the environment with the effluent emanating from the alumina production.

Yet another object of this invention is to provide a method for the manufacture of alumina hydrate of high whiteness and solid and liquid sodium aluminate of high purity.

SUMMARY OF THE INVENTION

To accomplish the objects described above according to the present invention, there is provided a method which, in the production of alumina by the Bayer Process, effects the removal of carbon compounds contained in the Bayer liquor by adjusting the Bayer liquor containing the carbon compounds and/or the substance serving to concentrate or solidify the liquid so that the molar ratio of the aluminum component to the sodium component therein falls in the range of from 1 to 5 calculated as $Al_2O_3/Na_2O$, and thereafter subjecting the adjusted Bayer liquor and/or the substance to a thermal treatment at a temperature in the range of from 500° to 1350° C. thereby substantially producing sodium aluminate and carbon dioxide gas.

BRIEF EXPLANATION OF THE DRAWING

The accompanying drawing represents a flow diagram of the process involved in Example 1.

DETAILED DESCRIPTION OF THE INVENTION

In the Bayer liquor, the carbon compounds are present chiefly in the form of soda salts of organic acids such as humic acid, succinic acid, acetic acid and oxalic acid and sodium carbonate as already pointed out.

When the Bayer liquor, either in its unaltered form or in a concentrated and solidified form, is heated, most carbon compounds other than sodium carbonate are converted first into sodium carbonate. As the heating is further continued, sodium carbonate reacts with alumina to produce sodium aluminate with generation of carbon dioxide gas. Since this sodium aluminate is returned into the system for re-use, the reaction of sodium carbonate with alumina must be performed thoroughly so that no part of sodium carbonate may remain unaltered after the reaction.

For this reason, the amount of the aluminum component to be contained in the liquid with respect to the amount of all the sodium components initially present in the liquid, namely, the sum of the amount of (a) sodium salts of organic acids and sodium carbonate which are carbon compounds and that of (b) sodium aluminate must be at least greater than is required for the formation of sodium aluminate ($NaAlO_2$). Specifically, it is imperative that the molar ratio of the aluminum component to the sodium component should fall in the range of from 1 to 5. When the molar ratio of the aluminum to the sodium component is smaller than 1, the solid substance produced by the heating treatment contains no free alumina of any form. This solid substance has an advantage in that it completely dissolves in water or the Bayer liquid without leaving any residue behind. On the other hand, there is a disadvantage that the sodium component in excess of its equivalent weight is wholly carbonated and remains and, consequently, degrades the efficiency of the removal of carbon compounds. In this case, there must be incorporated an extra treatment for causticizing the remaining sodium carbonate. So the operation is inconvenient. In order for the operation to be successfully performed so that no free alumina remains and no excess of the sodium component remains unaltered after the thermal treatment, the excess sodium component should account for about 10 to 20% by weight of the total sodium component in due consideration of a number of variations involved in the operation. In the above method as intermediate carbon compounds and sodium carbonate are converted into carbonic acid during the thermal treatment, a treatment for the removal of sodium oxalate is unnecessary. But a treatment for the causticization of sodium carbonate is required. This fact seriously impairs the advantage of the present invention.

For the purpose of this invention, the molar ratio of the aluminum component to the sodium component should fall in the range of from 1 to 5, preferably from 1 to 2, as $Al_2O_3/Na_2O$. For the purpose of curbing the formation of sodium carbonate, the molar ratio or the proportion of the aluminum component is desired to be greater than otherwise. It it is too large, however, the thermal energy required for the thermal treatment increases so much as to render the treatment uneconomical. Thus, the upper limit of the molar ratio has been fixed at 5.

In the Bayer liquid, part of the sodium component is present in the form of inorganic salts such as chlorides, sulfates, phosphates and fluorides. However, they account for a very small proportion. It is, therefore, sufficient from the practical point of view to adjust the molar ratio of the aluminum component on the basis of the total content of principal sodium compounds such as aluminates, chiefly carboxylates of oxalic acid, etc. and carbonates.

Where the molar ratio of the aluminum component to the sodium component exceeds 1, if the excess aluminum component happens to be alumina hydrate, then it often gives rise to gamma-alumina ($\gamma$-$Al_2O_3$), chi-alumina ($\chi$-$Al_2O_3$), etc. in the product of the thermal treatment. At times, part of the excess alumina component may convert into sodium-alumina compound.

In this invention, the origin of the Bayer liquor to be treated thereby is not limited to any specific portion of the whole Bayer Process. For high economy of the energy consumed in the thermal treatment, it is desirable to select the origin at which the issuing Bayer liquor has the highest possible concentration. Generally in the entire Bayer Process, sodium oxalate and other carbon compounds are concentrated most in the seed slurry used for the precipitation of alumina hydrate. Thus, the treatment by the method of this invention is most advantageously carried out on this slurry. Of course, the Bayer liquor taken from any portion of the whole process can be advantageously treated when it is suitably adjusted by addition of alumina hydrate or plain alumina as occasion demands. Where the liquid is concentrated by evaporation, it is desirable that alumina hydrate and other substances abounding with entrained water should be added to the liquid before the liquid undergoes the concentration.

The seed slurry for use in the precipitation of alumina hydrate, when selected for the treatment of this invention, is desired to be concentrated by evaporation before the slurry is subjected to the thermal treatment. This evaporation is advantageously carried out such as in a multiple effect evaporator by making use of the heat otherwise wasted in the thermal treatment. By reason of economy, the degree of this concentration is to be fixed so that the concentrated slurry still retains fluidity enough for smooth conveyance through the production system. Nevertheless, the concentration which is carried out further to the extent of solidifying the dissolved substance and, when necessary, enabling the solidified substance to be pelletized for ease of handling in the thermal treatment proves to be advantageous because the pellets completely eliminate the problem of otherwise possible occurrence of dust.

The thermal treatment is carried out at a temperature in the range of from 500° to 1350° C., preferably from 700° to 1000° C. At temperatures between 400° and 500° C., the sodium components combined with organic compounds and intermediate carbon compounds are converted only to sodium carbonate so that the desired removal of carbon compounds cannot be expected. At temperatures exceeding 1350° C., the product resulting from the thermal treatment is fused so as to render the operation extremely difficult and impair the economy of energy utilization. The time for the thermal treatment varies with the type of heat application, the temperature of heating, the total content of carbon compounds and other similar conditions and, for this reason, is fixed through a preliminary test. When the temperature of the thermal treatment is fixed at 800° C., for example, the reaction is substantially completed generally in about 40 to 60 minutes.

As the apparatus for the thermal treatment, there is adopted a rotary kiln or a fluidized calciner. The gas which emanates from this apparatus is a hot gas abounding with carbon dioxide gas and steam. This hot gas is utilized for drying and dehydration and then used as the heat source for the evaporation of the Bayer liquor before it is finally released into the atmosphere. For the purpose of drying and dehydration, a drier suitably selected from among the driers of fluidized type, agitation type, flash type and spray type can be used.

The solid substance (sodium aluminate containing alumina hydrate or plain alumina) which is discharged from the apparatus for the thermal treatment is hot. This hot solid substance is cooled through exchange of heat with the air used for the combustion. The cooled solid substance is crushed, when necessary, and thereafter dissolved.

The liquid used for dissolving the solid substance is selected from a freely selected portion of the whole Bayer Process. In this dissolution, alumina or alumina hydrate becomes itself as a residue. If this residue proves to be inconvenient for the main process or when the process is aimed at the production of sodium aluminate, the product of the dissolution of the solid substance may be subjected to a treatment of solid-liquid separation. For example, sodium aluminate is obtained in the form of a white powder when the residue of dissolution is filtered and the resultant filtrate is dried after concentration. The separated dissolution residue may be used in adjusting the molar ratio of the aluminum component to the sodium component in the Bayer liquor to a value falling in the range of from 1 to 5 calculated as $Al_2O_3/NaO_2$.

The method of the present invention (1) permits notably efficient removal of carbon compounds and, thereby, heightens the production efficiency of the Bayer Process itself and obviates the treatment for the causticization of sodium carbonate which has heretofore been found indispensable to the operation of the Bayer Process, (2) provides effective prevention of the environmental pollution causable with the effluent from the operation of the Bayer Process and (3) enables alumina hydrate of high whiteness and solid and liquid sodium aluminate of high purity to be produced with ease.

Now, the relation between the conditions for the treatment of the Bayer liquor by the method of this invention and the effect of the removal of carbon compounds will be described.

EXPERIMENT

Bayer liquor of the following composition was used for the present experiment. The molar ratio of the aluminum component to the sodium component was less than 1 as $Al_2O_3/Na_2O$.

TABLE 1

| Composition | NaOH | $Na_2CO_3$ | $Al_2O_3$ | COD | $Al_2O_3/Na_2O$ |
|---|---|---|---|---|---|
| Concentration (g/lit.) | 150 | 48 | 77 | 10.5 | (Molar ratio) 0.28 |

The adjustment of the molar ratio of $Al_2O_3/Na_2O$ was effected by addition of alumina trihydrate having an alumina trihydrate content of 99.7% by weight (on dry basis) and a water content of 11.0% by weight (unaltered form).

The aforementioned Bayer liquor, either in its unaltered form or in a form having the aforementioned alumina trihydrate added thereto to give a varying adjusted $Al_2O_3/Na_2O$ ratio, was concentrated, dried and dehydrated to afford a powdery solid substance. The solid substance was placed in an alumina-porcelain crucible and the crucible containing the substance was inserted in a furnace maintained at a prescribed temperature in the range of from 200° to 1400° C. and heated therein for a prescribed period. Thereafter, the product resulting from the heating was removed out of the furnace and was assayed for its chemical composition.

The results of the experiment are shown in Table 2 below, in conjunction with the conditions of the treatment.

TABLE 2

| Run No. | Conformity to invention | Amount of sample used | Amount of alumina hydrate added | Molar ratio ($Al_2O_3/Na_2O$) | Temperature of heating | Time of heating |
|---|---|---|---|---|---|---|
| 1 | x | 1.01 | 0 g | 0.28 | 200° C. | 1.0 hr |
| 2 | x | " | " | " | 400° C. | " |
| 3 | x | " | " | " | 950° C. | " |
| 4 | x | " | 685.0 | 1.75 | 400° C. | " |
| 5 | o | " | " | " | 600° C. | " |
| 6 | o | " | " | " | 950° C. | 0.8 |
| 7 | o | " | 380.0 | 1.10 | 800° C. | 0.6 |
| 8 | o | " | " | " | 1000° C. | 1.0 |
| 9 | o | " | " | " | 1200° C. | " |
| 10 | o | " | 1500.0 | 3.50 | 950° C. | " |
| 11 | o | " | " | " | 1350° C. | 0.6 |

TABLE 2-2

| Run No. | Conformity to invention | Chemical composition of product of heating | | | |
|---|---|---|---|---|---|
| | | $NaAlO_2$ | $Al_2O_3$ | $Na_2CO_3$* | COD* |
| 1 | x | 124 g | 0 g | 126 g | 27 g |
| 2 | x | 124 | 0 | 149 | 1 |
| 3 | x | 124 | 0 | 150 | 0 |
| 4 | x | 314 | 280 | 38 | 22 |
| 5 | o | 386 | 235 | 25 | 0 |
| 6 | o | 435 | 203 | 0 | 0 |
| 7 | o | 433 | 30 | 2 | 0 |
| 8 | o | 437 | 27 | 0 | 0 |
| 9 | o | 436 | 28 | 0 | 0 |
| 10 | o | 437 | 682 | 0 | 0 |
| 11 | o | 438 | 679 | 0 | 0 |

Remarks:
x represents other inventions than this invention
o represents this invention
The valves given in the columns indicated by the asterisk (*) are those calculated as NaOH.

From the results of the experiment given above, it is evident that perfect removal of carbon compounds is obtained by adjusting the molar ratio of the aluminum component to the sodium component in the Bayer liquor containing carbon compounds to a value falling in the range of from 1 to 5 as $Al_2O_3/Na_2O$ and then heating the resultant Bayer liquor at a temperature in the range of from 500° to 1350° C. Although in the experiment, the solid substances obtained by evaporating the Bayer liquor were subjected to the thermal treatment, the effects of the present invention were the same when the Bayer liquor was directly subjected to the thermal treatment.

Now, the present invention will be described more specifically by reference to working examples, which are purely illustrative of and not limitative of the invention.

EXAMPLE 1

The process involved in the present working example will be described with reference to the drawing representing a flow diagram thereof.

A seed slurry prepared for the precipitation of alumina hydrate was subjected to a treatment for the removal of carbon compound at a feed rate of 100 liters/day (equivalent to 83.5 liters of liquid per day). The composition of the seed slurry, as determined with respect to the liquid minus the suspended solids, was found to be 160 g/lit. of NaOH, 20 g/lit. of $Na_2CO_3$ (calculated as NaOH), 20 g/lit. of sodium salts of organic acids (calculated as NaOH) and 80 g/lit. of dissolved $Al_2O_3$.

Besides, the liquid contained 400 g/lit. of suspended alumina trihydrate (equivalent to 261 g/lit. of $Al_2O_3$). In this slurry, the molar ratio ($Al_2O_3/Na_2O$) was 1.54.

First the slurry was evaporated to twice the original concentration to afford a concentrate. To this concentrate, the dust circulating within a subsequent stage (composed roughly of 45% of $NaAlO_2$, 4% of $Na_2CO_3$, 40% of $Al_2O_3.3H_2O$ and 11% of other components) was added at a ratio of six parts by weight of the dust to one part by weight of the concentrate. The resultant mixture was kneaded, dried with the current of spent gas discharged from the rotary kiln, and then whirled in a cyclone for collection of solid particles. The composition of the solid particles was identical with that of the circulating dust mentioned above. Part of the solid particles were reserved for mixture with the aforementioned concentrate and the remaining major part thereof were placed in a rotary kiln (0.15 m in inside diameter and 2 m in length) and heated therein at 900° C.±30° C. for one hour to obtain a solid substance, which was then cooled to 100° C. This solid substance was produced at a rate of 40 kg/day. The composition of the solid substance was found to be about 75% of sodium aluminate and about 25% of alumina. Absolutely no carbon compounds were found in the substance.

When the Bayer liquor (having a composition of 160 g/lit. of NaOH, 20 g/lit. of $Na_2CO_3$ calculated as NaOH and 80 g/lit. of $Al_2O_3$) was added at a rate of 300 kg/day to the solid substance, the solid substance dissolved itself in the liquid and produced a suspension. When a high-molecular flocculant was added in the amount of about 5 ppm (based on the amount of the liquid) to the suspension, all the suspended particles settled. There were thus produced 38 lit./day of a slurry (thickened underflow) having a solids content of about 300 g/lit. and 240 lit./day of a clarified overflow.

Upon analysis, the clarified overflow was found to contain 230 g/lit. of NaOH and 163 g/lit. of dissolved aluminum compounds calculated as $Al_2O_3$. Upon X-ray analysis, the suspended solids of the thickened underflow were identified to be composed preponderantly of an intermediate and alumina. The clarified overflow was mixed with the liquid for the precipitation of alumina hydrate, while the slurry was filtered, washed with water and calcined to produce alumina.

By the process described above, sodium carbonate was removed at a rate of 2.2 kg/day and oxalic acid and other organic acids were removed at a rate of 0.6 kg/day calculated as COD.

EXAMPLE 2

In the system operated by the Bayer Process, a mother liquor composed of 160 g/lit. of NaOH, 20 g/lit. of $Na_2CO_3$ (calculated as NaOH), 20 g/lit. of sodium salts of organic acids (calculated as NaOH) and 80 g/lit. of dissolved aluminum (calculated as $Al_2O_3$) was continuously extracted at a rate of 10 liters/hour. The molar ratio of $Al_2O_3/Na_2O$ in this mother liquor was 0.31, a value less than 1. So, alumina trihydrate was added to this liquor at a rate of 3.5 kg/hour (calculated as $Al_2O_3.3H_2O$) to adjust the molar ratio, $Al_2O_3/Na_2O$, of the slurry to 1.2. The resultant liquor was heated in a fluidized calciner 30 cm in inside diameter and 40 cm in height at temperatures in the range of from 850° to 1000° C., with the flow volume fixed at 12 liters per hour. The time of heating averaged about 60 minutes.

The calciner delivered 4 kg/hr of solid sodium aluminate and 3 $m^3$/hr of carbon dioxide gas (N.T.P.).

The solid sodium aluminate was a white powder which consisted of 89.0% of $NaAlO_2$ and 11.0% of $Al_2O_3$ and contained absolutely no carbon compound.

The powder mentioned above was dissolved in water. The resultant solution was filtered to separate the residue (alumina and alumina hydrate). The filtrate was dried with a spray drier at 300° C., to afford sodium aluminate in the form of a white powder. The powder was found to have an $NaAlO_2$ content of 99.0%.

What is claimed is:

1. A method for the removal of carbon compounds from the Bayer liquor having aluminum compounds and sodium compounds as the principal components, also containing carbon compounds and circulating through a system for the manufacture of alumina from an alumina-containing ore by the Bayer Process, which method comprises adjusting the molar ratio of the aluminum component to the sodium component in the Bayer liquor to a value falling in the range of from 1 to 5 calculated as $Al_2O_3/Na_2O$ and thereafter heating the resultant Bayer liquor at a temperature in the range of from 500° to 1350° C.

2. The method according to claim 1, wherein the adjustment of the molar ratio of the aluminum component to the sodium component contained in the Bayer liquor is effected with respect to the Bayer liquor itself.

3. The method according to claim 1, wherein the adjustment of the molar ratio of the aluminum component to the sodium component contained in the Bayer liquor is effected on the Bayer liquor after the Bayer liquor has been concentrated.

4. The method according to claim 3, wherein the concentration of the Bayer liquor is carried out until the liquor is transformed into a solid concentrate.

5. The method according to claim 1, wherein the heating of said resultant Bayer liquor at a temperature in the range of from 500° to 1350° C. produces a solid substance which is a mixture consisting of $NaAlO_2$ and $Al_2O_3$.

6. The method according to claim 5, further comprising dissolving said solid substance in water, separating the resultant dissolution solution into the dissolution residue and a clear solution, concentrating the separated clear solution to obtain a concentrate and drying said concentrate to obtain white powdered sodium aluminate.

7. The method according to claim 5, further comprising dissolving said solid substance in one member selected from the group consisting of water and Bayer liquor, separating the resultant dissolution solution into the dissolution residue and a clear solution and using the separated dissolution residue in adjusting the molar ratio of the aluminum component to the sodium component in the Bayer liquor to a value falling in the range of from 1 to 5 calculated as $Al_2O_3/Na_2O$.

* * * * *